(12) United States Patent
Cowley et al.

(10) Patent No.: US 11,606,521 B2
(45) Date of Patent: Mar. 14, 2023

(54) IMAGE SENSORS WITH REDUCED PEAK POWER

(71) Applicant: SEMICONDUCTOR COMPONENTS INDUSTRIES, LLC, Phoenix, AZ (US)

(72) Inventors: Nicholas Paul Cowley, Wroughton (GB); Andrew David Talbot, Chieveley (GB)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 200 days.

(21) Appl. No.: 17/249,580

(22) Filed: Mar. 5, 2021

(65) Prior Publication Data
US 2022/0286634 A1    Sep. 8, 2022

(51) Int. Cl.
*H04N 5/378* (2011.01)
*H04N 5/374* (2011.01)
*H04N 5/369* (2011.01)
*H04N 5/3745* (2011.01)

(52) U.S. Cl.
CPC ........... *H04N 5/3698* (2013.01); *H04N 5/378* (2013.01); *H04N 5/3742* (2013.01); *H04N 5/3745* (2013.01)

(58) Field of Classification Search
CPC .. H04N 5/3698; H04N 5/3742; H04N 5/3745; H04N 5/378
See application file for complete search history.

(56) References Cited

U.S. PATENT DOCUMENTS

2007/0222876 A1*  9/2007  Yonemoto ............ H04N 5/3658
                                                           348/294

OTHER PUBLICATIONS

Likamwa et al., "Energy Characterization and Optimization of Image Sensing Toward Continuous Mobile Vision," MobiSys 2013—Proceedings of the 11th Annual International Conference on Mobile Systems, Applications, and Services, Jun. 2013, pp. 69-82.
Ginsburg et al., "Dual Time-Interleaved Successive Approximation Register ADCs for an Ultra-Wideband Receiver," in IEEE Journal of Solid-State Circuits, vol. 42, No. 2, pp. 247-257, Feb. 2007.

* cited by examiner

*Primary Examiner* — Lin Ye
*Assistant Examiner* — Chriss S Yoder, III
(74) *Attorney, Agent, or Firm* — Treyz Law Group, P.C.; Tianyi He (57) ABSTRACT

An image sensor may include a pixel array having pixels arranged in rows and columns, column readout circuitry, and control circuitry. Column readout circuitry may include corresponding readout circuits each coupled to a corresponding column path for a respective column of pixels. The readout circuits may each include signal processing circuits such as correlated double sampling circuitry and analog-to-digital converter circuitry. To reduce peak-to-average power ratio, during the signal processing operations for each pixel row, the control circuitry may control the signal processing circuits to perform time-domain multiplexing across the pixel columns to activate the signal processing circuits at varied times within the row time. If desired, the pattern of time-domain multiplexing may be varied across the signal processing operations for different pixel rows and/or for different image frames.

20 Claims, 6 Drawing Sheets

IMAGE SENSORS WITH REDUCED PEAK POWER

BACKGROUND

This relates generally to imaging systems and more specifically to image sensors with reduced peak power (e.g., reduced peak to average power ratio).

Image sensors include image sensor pixels often coupled to corresponding pixel readout circuits using parallel pixel readout paths such as column paths that couple columns of image sensor pixels to corresponding readout circuits. The readout circuits can operate in an active state during which the readout circuits are consuming relatively higher power or be in a static state during which the readout circuits are consuming relatively lower power.

In some image sensors, especially in those having a relatively large pixel array (e.g., a stitched pixel array), the readout circuits can be in the static (low power usage) state for a relatively longer period of time and can operate in an active (high power usage) state for a relatively shorter period of time. This can lead to an undesirably high peak to average power ratio (PAPR). A high PAPR is undesirable because additional power integrity and signal integrity demands are placed on the system (e.g., the system has to tolerate all degradations resulting from current surges as power usage fluctuates substantially across time).

While the system can be adapted to mitigate at least some of these issues, these adaptations will result in additional undesired costs such as increased noise (e.g., from increased analog-to-digital conversion time and leakage from analog-to-digital converter elements) and increased physical implementation area and average power. It may therefore be desirable to reduce peak power (to average power ratio) while reducing these additional costs.

It is within this context that the embodiments herein arise.

DETAILED DESCRIPTION

Electronic devices such as digital cameras, computers, cellular telephones, and other electronic devices may include image sensors that gather incoming light to capture an image (e.g., an image frame). The image sensors may include arrays of image sensor pixels. The pixels in the image sensors may include photosensitive elements such as photosensitive elements that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
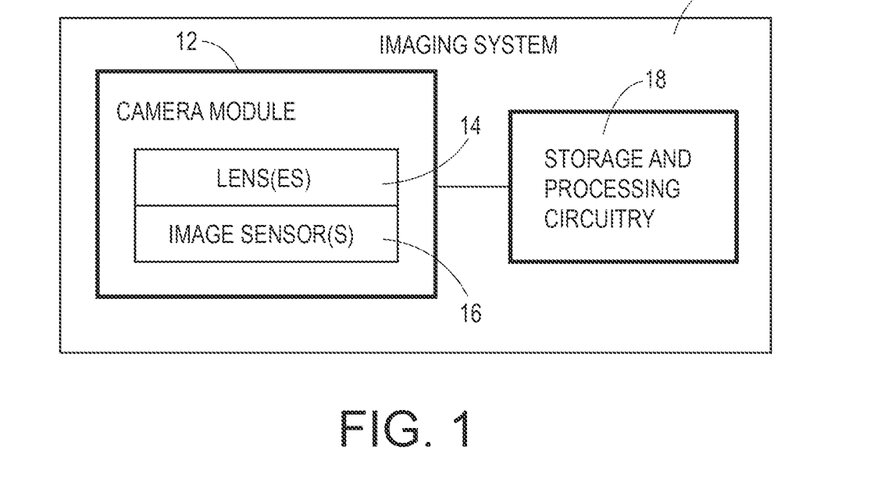
FIG. 1 is a diagram of an illustrative imaging system having an image sensor and processing circuitry in accordance with some embodiments.

FIG. 1 is a diagram of an illustrative imaging system such as an electronic device that uses an image sensor to capture images. Imaging system 10 of FIG. 1 may be a camera, a cellular telephone, a tablet computer, a webcam, a video camera, a video surveillance system, an automotive imaging system, a video gaming system with imaging capabilities, an augmented reality and/or virtual reality system, an unmanned aerial vehicle system (e.g., a drone), an industrial system, or any other desired imaging system or device that captures digital image data. Camera module 12 (sometimes referred to as an imaging module) may be used to convert incoming light into digital image data. Camera module 12 may include one or more lenses 14 and one or more corresponding image sensors 16. During image capture operations, light from a scene may be focused onto image sensor 16 by lenses 14. Image sensor 16 may include analog-to-digital converter (ADC) circuitry for converting analog pixel signals into corresponding digital image data that is provided to storage and processing circuitry 18.

Storage and processing circuitry 18 may include one or more integrated circuits (e.g., image processing circuits, microprocessors, storage devices such as random-access memory and non-volatile memory, etc.) and may be implemented using components that are separate from the camera module and/or that form part of the camera module. When storage and processing circuitry 18 is included on different integrated circuits than those of image sensors 16, the integrated circuits with circuitry 18 may be vertically stacked or packaged with respect to the integrated circuits with image sensors 16. Image data that has been captured by the camera module may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, an external display, or other devices) using wired and/or wireless communications paths coupled to processing circuitry 18.

Figure 2:
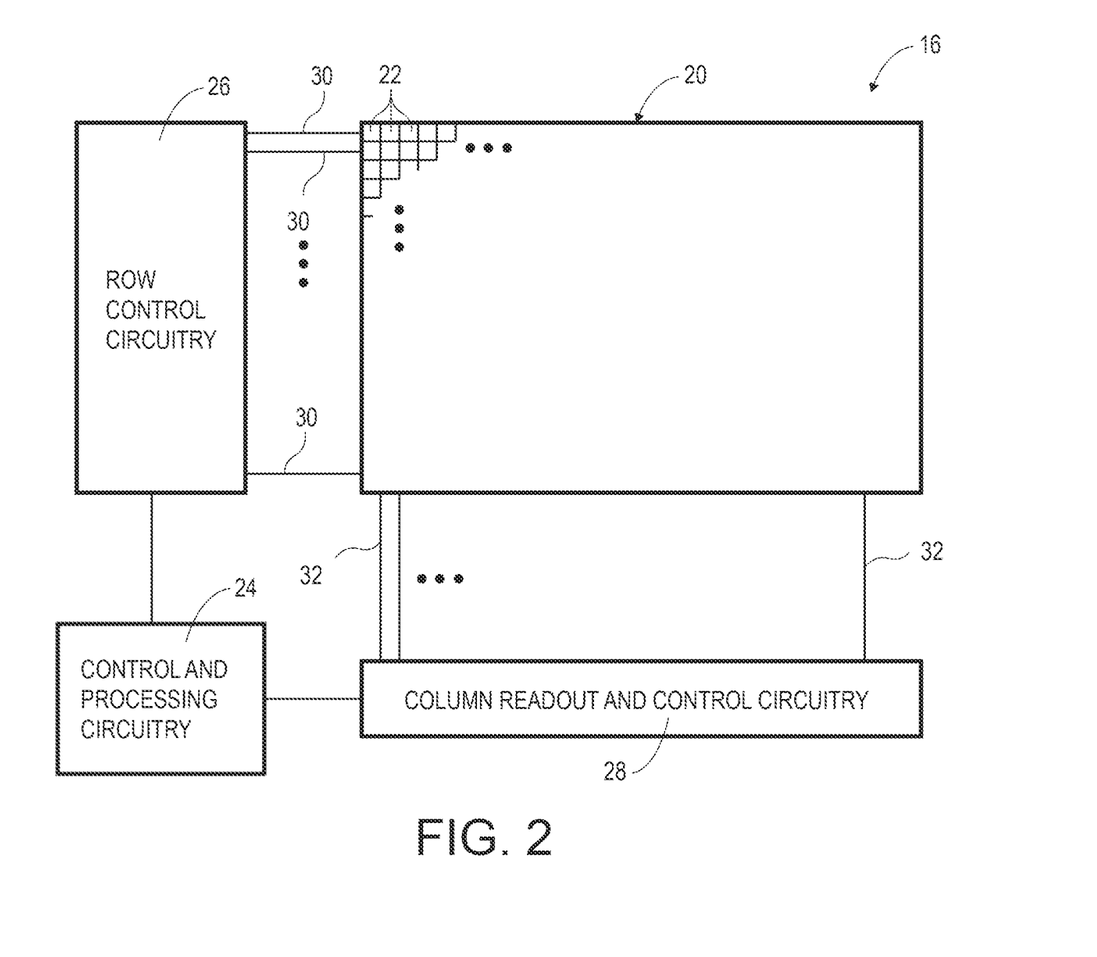
FIG. 2 is a diagram of an illustrative image sensor having a pixel array and corresponding control and readout circuitry in accordance with some embodiments.

As shown in FIG. 2, image sensor 16 may include pixel array 20 containing image sensor pixels 22 (sometimes referred to herein as image pixels or pixels) arranged in rows and columns, and may include control and processing circuitry 24. Array 20 may contain, for example, hundreds or thousands of rows and columns of image sensor pixels 22. Control circuitry 24 may be coupled to row control circuitry 26 and column readout and control circuitry 28 (sometimes referred to herein as column readout circuitry or column control circuitry). Row control circuitry 26 may receive row addresses and control signals from control circuitry 24 and supply corresponding row control signals such as reset, anti-blooming, row select, charge transfer, dual conversion gain mode, and readout control signals to rows of pixels 22 over row control paths 30. While only one path 30 is shown for each row of pixels 22, this is merely illustrative. Any corresponding number of paths 30 may be coupled to each row of pixels 22.

One or more conductive lines such as column lines 32 may be coupled to each column of pixels 22 in array 20. Column lines 32 may be used for reading out (reset level or image level) signals from pixels 22 and for supplying bias signals (e.g., bias currents or bias voltages) to pixels 22. If desired, during pixel readout operations, a pixel row in array 20 may be selected using row control circuitry 26 and a signal generated by each corresponding image pixel 22 in that pixel row can be read out along a respective column line 32.

Column readout circuitry 28 may receive signals (e.g., analog pixel values generated by pixels 22) over column lines 32. Column readout circuitry 28 may include memory circuitry for temporarily storing calibration signals (e.g., reset level signals, reference level signals) and/or image signals (e.g., image level signals) read out from array 20, amplifier circuitry or a multiplier circuit, analog-to-digital converter (ADC) circuitry, bias circuitry, latch circuitry for selectively enabling or disabling the column circuitry, or other circuitry that is coupled to one or more columns of pixels in array 20 for operating pixels 22 and for reading out signals from pixels 22. After reading out and/or processing signals from pixel 22, column readout circuitry 28 may supply the readout pixel data to control and processing circuitry 24 and/or processor 18 (FIG. 1) for further processing and/or storage.

Pixel array 20 may be provided with a filter array having multiple (color) filter elements (each corresponding to a respective pixel) which allows a single image sensor to sample light of different colors or sets of wavelengths. As an example, image sensor pixels 22 may be provided with a color filter array having red, green, and blue filter elements, which allows a single image sensor to sample red, green, and blue (RGB) light using corresponding red, green, and blue image sensor pixels arranged in a Bayer mosaic pattern. These examples are merely illustrative and, in general, filter elements of any desired color and/or wavelength and in any desired pattern may be formed over any desired number of image pixels 22. Additionally, pixel array 20 may also be provided with a microlens array having multiple microlenses of one or more types. Each microlens may be configured to focus light onto a corresponding photosensitive element in a pixel. If desired, microlenses may be omitted for one or more photosensitive elements.

Figure 3:
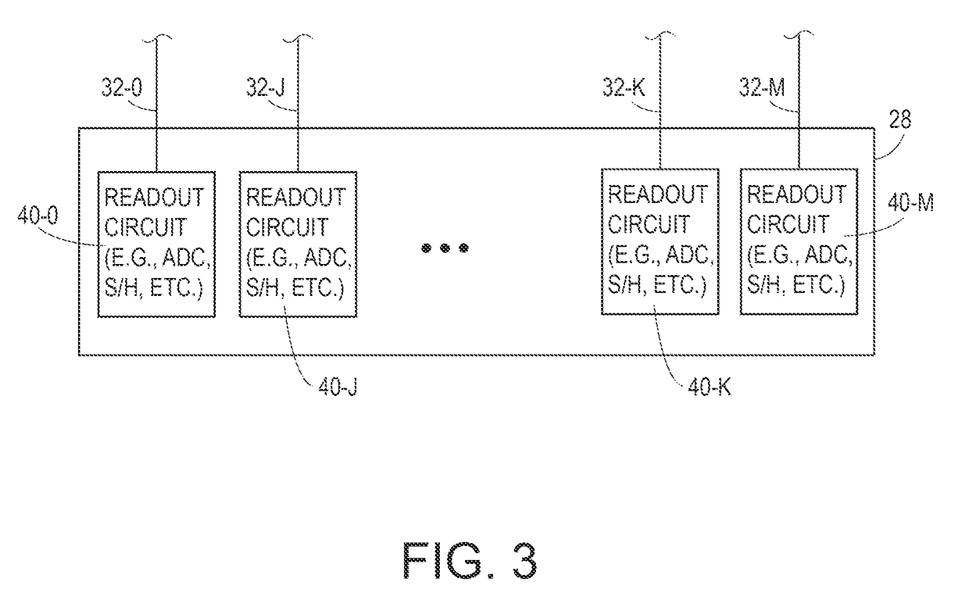
FIG. 3 is a diagram of illustrative readout circuits for respective pixel columns in control and readout circuitry in accordance with some embodiments.

FIG. 3 further details an illustrative implementation of control and readout circuitry 28 in FIG. 2. As shown in FIG. 3, column control and readout circuitry 28 includes corresponding readout circuits 40 for each pixel column in array 20. As examples, each readout circuit (e.g., readout circuit 40-0 coupled to column path 32-0 for pixels 22 in column 0, readout circuit 40-J coupled to column path 32-J for pixels 22 in column J, readout circuit 40-K coupled to column path 32-K for pixels 22 in column K, and readout circuit 40-M coupled to column path 40-M for pixels 22 in column M) includes one or more of sample and hold (S/H) circuitry, ADC circuitry, correlated double sampling (CDS) circuitry (e.g., circuitry configured to perform digital or analog CDS operations), etc.

Parallel column paths 32 (sometimes referred to herein as column lines 32) may be used to read out pixel signals (e.g., reset level signals and corresponding image level signals for CDS operations) from each pixel 22 in the corresponding pixel column. In particular, control circuitry 24 (FIG. 2) may be configured to provide control signals to row control circuitry 26 (and thereby to pixels 22) and each readout circuit 40 to perform readout operations on a row-by-row basis. As an example, during readout operations for a first pixel row (e.g., row N), column path 32-0 and readout circuit 40-0 may receive reset and image level signals from pixel 22 in row N and column 0, and during readout operations for a second pixel row (e.g., row N+1), column path 32-0 and readout circuit 40-0 may receive reset and image level signals from pixel 22 in row N+1 and column 0. In an analogous manner, other column paths 32 and readout circuits 40 may each receive pixel signals from the pixel in the corresponding row and column during the appropriate pixel row readout operation.

In some illustrative configurations, each readout circuit 40 may operate in a pipelined mode of operation. In particular, a given readout circuit 40 may include multiple circuits performing multiple operations. As an example, a first signal may be received at a first circuit and subsequently passed to a second downstream circuit for further processing. The second downstream circuit may process the first signal while a second signal is received at the first circuit. As an example, the first circuit may be a signal sampling circuit, while the second circuit may be a signal processing circuit. Illustrative configurations in which the first circuit is a sampling circuit (for ADC circuitry) and the second circuit is ADC circuitry are described herein as illustrative examples. However, this is merely illustrative. If desired, the second circuit may be any suitable signal processing circuit such as (digital) correlated double sampling (CDS) circuitry. If desired, each readout circuit 40 may include other functional circuits in addition to first and second circuits.

Figure 4:
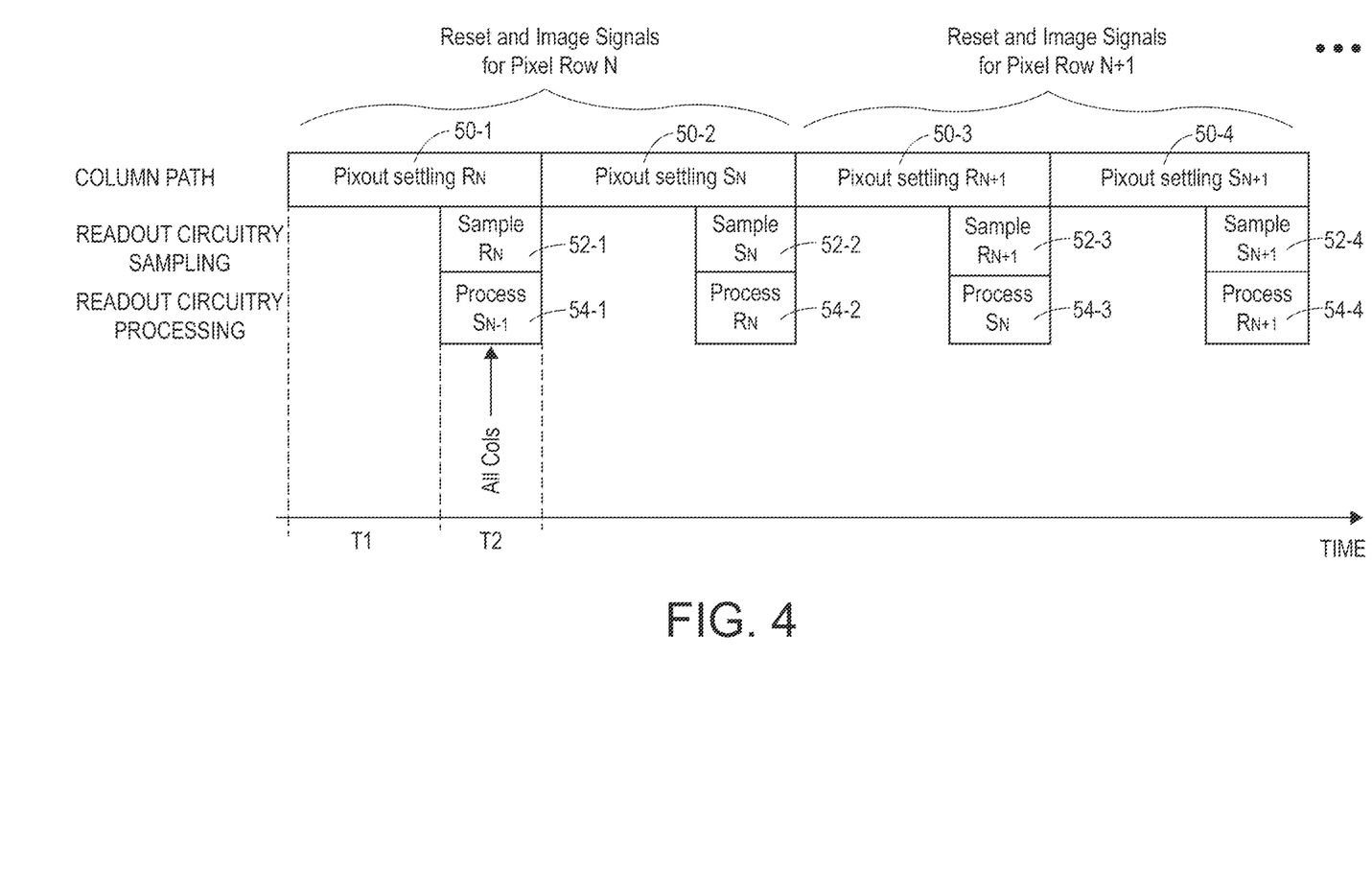
FIG. 4 is an illustrative timing diagram for performing readout operations for different pixel columns in parallel in accordance with some embodiments.

FIG. 4 is an illustrative timing diagram for operating an illustrative imaging system during readout operations. In particular, to perform these readout operations, control circuitry may coordinate (e.g., send control signals to) row control circuitry (row drivers) and column readout circuitry such that pixels and column readout circuitry perform the readout operations shown in FIG. 4.

In the example of FIG. 4, the readout operations are pipelined (e.g., each step or operation in the readout operations occurs in a pipelined manner). In other words, sampling for reset level signals for the current row N (at a first portion of a given readout circuit 40) may occur in parallel with processing of signal level signals for the previous row N−1 (at a second portion of the given readout circuit 40). However, this is merely illustrative. If desired, some operations in FIG. 4 may be slightly offset from one another (e.g., may be slightly delayed) instead of being perfectly aligned as illustrated.

As shown in FIG. 4, for each pixel 22 in a given pixel row, a reset level signal and an image level signal is read out into column readout circuitry 28. To properly read out a pixel signal from a given pixel 22, control circuitry (e.g., row drivers in row control circuitry 26) may control the given pixel 22 (e.g., assert a row select control signal for the entire pixel row) to output a pixel signal from the given pixel 22 onto the pixel output path coupled to column path 32. After a suitable time period (referred to herein as a settling time period) from the instigation of the row read, the output pixel signal may settle to an accurate voltage at an output terminal of column path 32 (e.g., the terminal coupled to a given readout circuit 40 in column readout circuitry 28).

In the example of FIG. 4, column paths 32 may exhibit a first settling period for reset level signals $R_N$ for pixels 22 in pixel row N (e.g., associated with parallel settling operations 50-1 on each of the column paths 32 in FIG. 3) and may subsequently exhibit a second settling period for image level signals $S_N$ for pixels 22 in pixel row N (e.g., associated with parallel settling operations 50-2 on each of the column paths 32 in FIG. 3). As shown in FIG. 4, column paths 32 may similar exhibit settling periods for corresponding pixel output signals for each pixel 22 in the other pixel rows of pixel array 20 (e.g., pixel row N−1, pixel row N+1, etc.).

Column readout circuitry 28 (e.g., each readout circuit 40 in FIG. 3) may sample corresponding pixel output signals after the corresponding pixel output signals has accurately settled on column paths 32. In a pipelined mode of operation, each readout circuit 40 may also perform other operations such as processing operations for pixel output signals from pixels 22 in a previous pixel row in parallel. As an example, while each readout circuit 40 performs sampling operations for signal $R_N$ from pixels 22 in current row N (e.g., operations 52-1), that readout circuit 40 may also perform ADC conversion operations or other processing operations for pixels 22 in a previous row N−1 (e.g., operations 54-1).

In the illustrative timing configuration of FIG. 4 (e.g., associated with a corresponding readout circuitry configuration), sampling operation 52-1 (e.g., during period T2) starts before the end of settling operation 50-1 (e.g., before the completion of pixel output line settling) such that a portion of sampling operation 52-1 may occur in parallel (simultaneously) with settling operation 50-1. However, this is merely illustrative and may be implemented only in some readout circuitry configurations. In other readout circuitry configurations, a sampling operation may begin at or after the end of a settling operation (e.g., settling operation 50-1 and sampling operation 52-1 may be temporally non-overlapping or occur strictly sequentially). The embodiments described herein relating to reducing peak power (e.g., described in detail in connection with FIG. 5) may similarly be applicable (in an analogous manner) to any of these scenarios (e.g., applicable to any of these readout circuitry implementations).

Additionally, sampling operation 52-1 and processing operation 54-1 are illustratively shown in FIG. 4 to occur simultaneously (e.g., having the same start and end times). However, this is similarly illustrative and may be implemented only in some readout circuitry configurations. In other readout circuitry configurations, sampling operations and processing operations may have different respective lengths, occur (e.g., begin or end) at different respective times (being offset from each other), and/or have other characteristics depending on the particular readout circuitry configuration. The embodiments described herein relating to reducing peak power (e.g., described in detail in connection with FIG. 5) may similarly be applicable (in an analogous manner) to any of these scenarios (e.g., applicable to any of these readout circuitry implementations).

In some imaging systems such as an imaging system having a large image sensor pixel array (e.g., a stitched image sensor pixel array formed from a stamp-and-repeat process based on multiples instances of a same pixel array tile), the pixel output signal settling period may be long compared to the time period during which column readout circuitry 28 is activated (e.g., during sampling operations 52, during processing operations 54, etc.). In particular, as an illustrative example, the pixel output signal settling period may be longer than in other imaging systems due to the longer length of the column path and the large number of pixels coupled to each column path 32 (e.g., the resulting parasitic effects). This may undesirably increase peak power usage in the imaging system (e.g., may undesirably increase the peak to average power ratio).

As shown in FIG. 4, during time period T1, column readout circuitry 28 (e.g., each of readout circuits 40 in FIG. 3 performing operations 52 and 54) may be in a static state (e.g., a low power usage state or a passive state). During time period T2, column readout circuitry 28 (e.g., each of readout circuits 40 in FIG. 3 performing operations 52 and 54) may be in an active state (e.g., a high power usage state). In other words, during time period T2, corresponding readout circuits 40 coupled to all column paths 32 in FIG. 3 may be simultaneously in the active state, thereby drawing a substantial amount of power. This illustrative operation of column readout circuitry 28 during time periods T1 and T2 (and during analogous time periods for other pixel signals and for other pixel rows) can lead to a high peak power relative to the average power.

Figure 5:
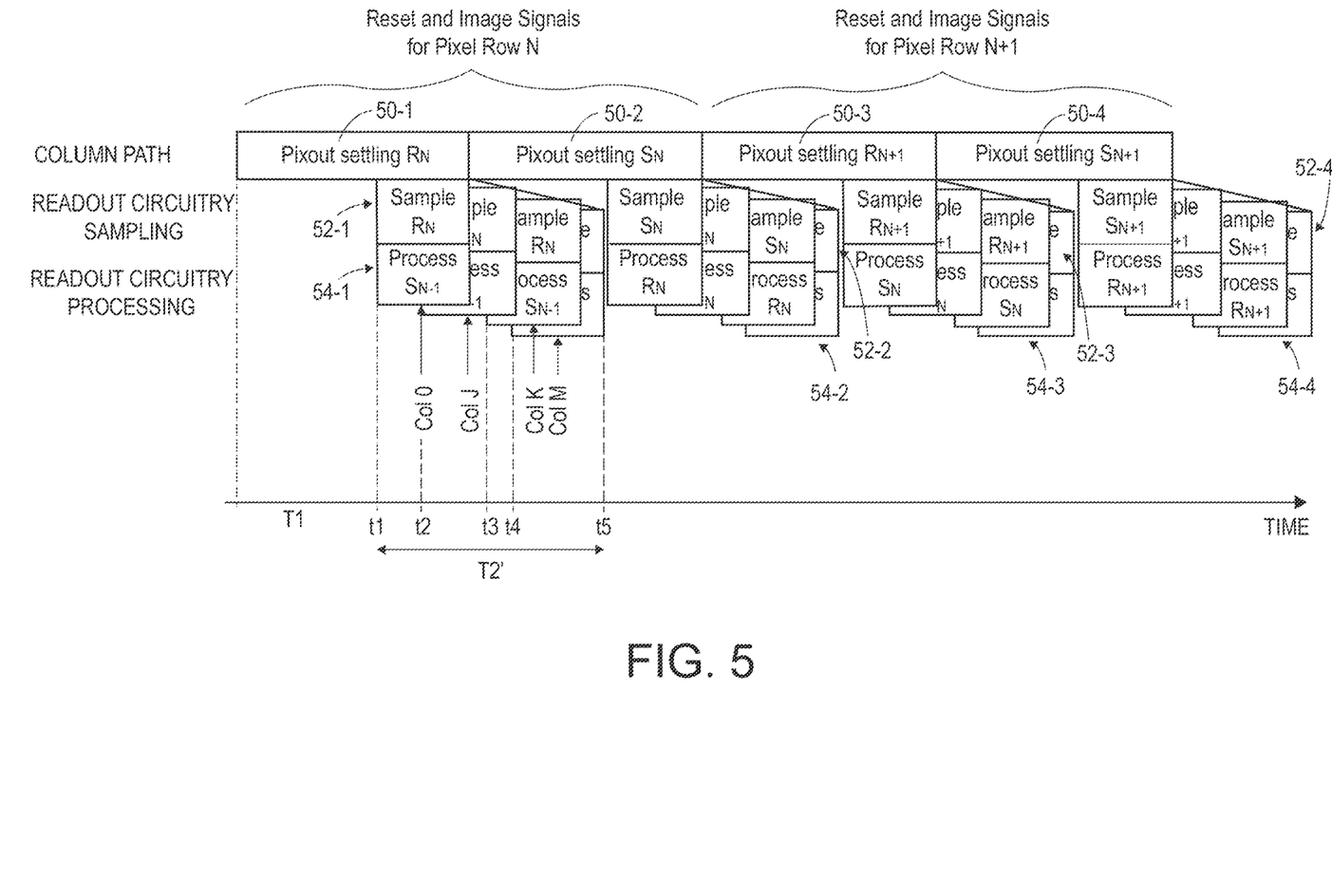
FIG. 5 is an illustrative timing diagram for time-domain multiplexing readout operations across different pixel columns in accordance with some embodiments.

In order to reduce peak power usage (e.g., peak to average power ratio), an imaging system may perform pixel readout operations in the manner as shown in FIG. 5 or in a manner modified from FIG. 5 as described above in connection with FIG. 4 (e.g., sampling operations beginning at or after the end of corresponding settling operations, sampling operations and processing operations having different respective lengths, occurring at different respective times, and/or having other characteristics, etc.). In particular, control circuitry 24 may coordinate (e.g., send control signals to) row control circuitry 26 and column readout circuitry 28 (e.g., readout circuits 40 in FIG. 3) such that pixels 22 and column readout circuitry 28 perform the readout operations shown in FIG. 5.

As shown in FIG. 5, column readout circuitry 28 may be configured perform sampling operations 52 and processing operations 54 for different pixels in the same column in an offset manner (e.g., a first readout circuit 40 coupled to a first pixel column may perform sampling and/or processing operations during a first time period offset from a second time period during which a second readout circuit 40 coupled to a second pixel column performs sampling and/or processing operations). This offsetting process may sometimes be referred to herein as time-domain multiplexing.

In the illustrative example of FIG. 5, sampling operations 52-1 for reset level signals $R_N$ from pixels 22 in pixel row N are shown to be offset on a column-by-column basis. In other words, at time t1, a portion of readout circuit 40-0 in FIG. 3 coupled to pixel column 0 may be activated (e.g., in an active state) to perform sampling operations 52-1 for signal $R_N$ on column path 32-0. At time t2, a portion of readout circuit 40-J in FIG. 3 coupled to pixel column J may be activated (e.g., in an active state) to perform sampling operations 52-1 for signal $R_N$ on column path 32-J. At time t3, a portion of readout circuit 40-K in FIG. 3 coupled to pixel column K may be activated (e.g., in an active state) to perform sampling operations 52-1 for signal $R_N$ on column path 32-K. At time t4, a portion of readout circuit 40-M in FIG. 3 coupled to pixel column M may be activated (e.g., in an active state to perform sampling operations 52-1 for signal $R_N$ on column path 32-M. If desired, other readout circuits for other columns may perform sampling operations 52-1 in an analogous offset manner. By operating column readout circuitry 28 in this manner (e.g., performing time-domain multiplexing), peak power usage in the imaging system may be significantly reduced and undesirable peak to average power ratio effects can be substantially mitigated.

In a pipelined mode of operation, during sampling operation 52-1 for each readout circuit 40, that readout circuit 40 (e.g., an ADC conversion portion of readout circuit 40) may also be activated to perform other functions such as processing operations (e.g., ADC conversion operations) for pixels signals from a previous pixel row (e.g., image level signal $S_{N-1}$ for pixel row N−1). In a similar manner to column readout circuitry 28 performing time-domain multiplexing for sampling operations 52-1 across the different pixel columns, column readout circuitry 28 may also perform time-domain multiplexing for processing operations 54-1 across the different pixel columns. In other words, each readout circuit 40 (FIG. 3) may be activated at different times to perform its corresponding procession operation 54-1.

Configurations in which processing operations 54 are ADC conversion operations performed by corresponding ADC circuitry in readout circuit 40 are described herein as illustrative examples. In these configurations, during operations 52-1, each ADC circuitry 40 may sample the pixel signal (signal $R_N$) from the corresponding column path onto the input terminal of that ADC circuitry 40 in an offset manner as shown in FIG. 5. During simultaneous operations 54-1 in a pipelined mode of operation, each ADC circuitry 40 may also perform the actual conversion operation for the previously sampled pixel signal (signal $R_{N-1}$) in an offset manner as shown in FIG. 5. If desired, at least the sampling operations and/or the conversion operations for one or more ADC circuitry 40 in FIG. 3 may be offset relative to the sampling operations and/or the conversion operations for one or more other ADC circuitry 40 in FIG. 3 to achieve time-domain multiplexing.

Sampling and/or processing operations 52-1 and 54-1 may occur during time period T2' (between times t1 and t5). In the example of FIG. 5, the length of operations 52-1 and 54-1 have been exaggerated for illustrative purposes. It may be desirable that substantially all sampling operations 52-1 for different pixel columns (and substantially all processing operations 54-1 for different pixel columns) temporally overlap with settling operations 50-1. In other words, the time period for settling operation 50-1 (e.g., the settling time period) may be the sum of time periods T1 and T2' and settling operations 50-1 may end near, at, or after time t5.

While time-domain multiplexing has been described above in connection with the sampling operations of the reset level signals for pixel row N (operations 52-1) and with the processing operations of the image level signals for pixel row N−1 (operations 54-1), this is merely illustrative. If desired, column readout circuitry 28 (e.g., readout circuits 40) may perform time-domain multiplexing for the sampling operations of the image level signals for pixel row N (operations 52-2) and the processing operations of the reset level signals for pixel row N (operations 54-2), for the sampling operations of the reset level signals for pixel row N+1 (operations 52-3) and the processing operations of the image level signals for pixel row N (operations 54-3), for the sampling operations of the image level signals for pixel row N+1 (operations 52-4) and the processing operations of the reset level signals for pixel row N (operations 54-2), and for analogous operations of signals for any other pixel row. If desired, corresponding correlated double sampling (CDS) operations may take place to subtract reset level signals from corresponding image level signals. If desired, digital CDS operations may also be pipelined and time-domain multiplexed across different columns.

Figure 6A:
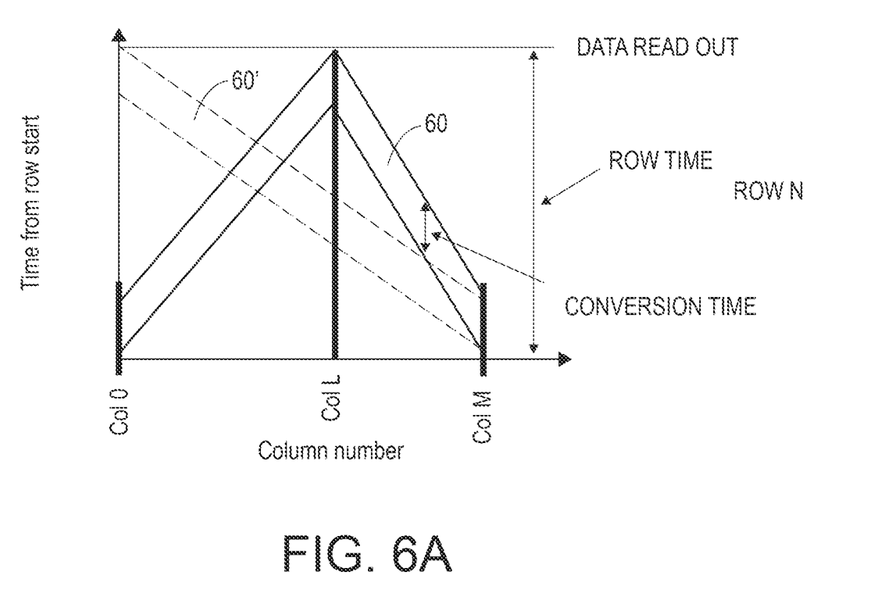
FIGS. 6A and 6B are diagrams of illustrative manners in which analog-to-digital conversion operations for different pixel columns within different corresponding pixel rows may be offset from one another within a row time in accordance with some embodiments.
Figure 6B:
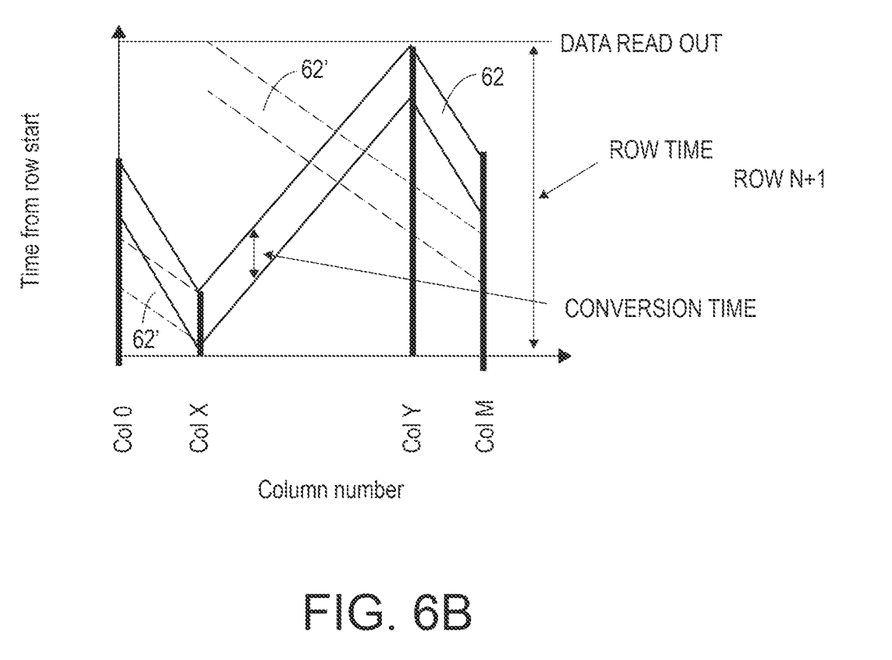

In some implementations, it may be desirable to perform time-domain multiplexing by activating different patterns or sets of readout circuits (e.g., readout circuits 40 in FIG. 3) in different orders when reading pixel signals out of different pixel rows or for different image frames. FIGS. 6A and 6B are diagrams showing two illustrative ADC conversion schemes for two different pixel rows. In the illustrative examples of FIGS. 6A and 6B, ADC conversion operations (e.g., implementing operations 54 in FIG. 5) are described. If desired, other sampling and processing operations (e.g., digital CDS operations) may similarly occur in place of these ADC conversion operations.

FIG. 6A shows an illustrative ADC conversion scheme for an illustrative pixel row (e.g., row N) having pixels from multiple columns (e.g., columns 0 to M) each coupled to a corresponding readout circuit 40 (FIG. 3). Different readout circuits 40 (e.g., ADC circuitry) coupled to different pixels in row N may be activated at different times within a row time (e.g., the row time including column path settling time as described in connection with FIG. 5). This is shown as a linear band 60, which is indictive of the ADC conversion time for each column relative to the row time. As shown in FIG. 6A, corresponding ADC circuitry (e.g., in readout circuits 40-0 and 40-M in FIG. 3) coupled to columns 0 and M may be activated first to perform ADC conversion operations (e.g., processing operations 54 in FIG. 5) near the start of row time. Other ADC circuitry coupled to columns between columns 0 and M may perform ADC conversion operations in at offset times from the start of row time as indicated by band 60.

In particular, in the example of FIG. 6A, ADC circuitry (in a corresponding readout circuit 40) coupled to a middle column (e.g., column L) may perform ADC conversion operations near the end of the row time (e.g., the last of the ADC circuitry to be activated). ADC circuitry coupled to columns between columns 0 and L may begin ADC conversion operations progressively later and later from the start of row time. Similarly, ADC circuitry coupled to columns between columns M and L may begin ADC conversion operations progressively later and later from the start of row time.

However, this example of using the ADC conversion times indicated by band 60 is merely illustrative. If desired, other patterns of activating ADC circuitry or other readout circuits coupled to different columns may also be used. As also shown in FIG. 6A, band 60' indicative of another pattern or order of performing ADC conversion across the different columns within the row time may be used for the conversion scheme instead of the ADC conversion time indicated by 60, if desired. Using the ADC conversion time indicated by band 60', ADC circuitry coupled to column M may begin and perform ADC conversion first during the row time, and ADC circuitry for other columns may perform ADC conversion at progressively later times until the last ADC conversion operation performed by ADC circuitry for column 0.

FIG. 6B shows an illustrative ADC conversion scheme for an illustrative pixel row (e.g., pixel row N+1) having pixels from multiple columns (e.g., columns 0 to M) each coupled to a corresponding readout circuit 40 (FIG. 3). Similar to the ADC conversion schemes described in connection with FIG. 6A, ADC circuitry coupled to different column may be activated (to perform conversion or other processing operations) at different times across the row time. In the example of FIG. 6B, ADC circuitry coupled to column X may be activated first in the row time to perform the conversion operation during the conversion time, while ADC circuitry coupled to column Y may be activated last in the row time to perform the conversion operation during the conversion time. Other ADC circuitry coupled to other columns may perform the conversion operation at incremental times between the first and last conversion times for columns X and Y. This illustrative ADC conversion scheme with corresponding conversion times is shown by band 62.

However, this example of using ADC conversion times indicate by band 62 is merely illustrative. If desired, other patterns of activating ADC circuitry or other readout circuits coupled to different columns may also be used. As also shown in FIG. 6B, band 62' indicative of another pattern or order of performing ADC conversion across the different columns within the row time may be used for the conversion scheme instead of ADC conversion time 62, if desired. Using the conversion time indicated by band 62', ADC circuitry coupled to column X may still begin and perform ADC conversion first during the row time, but ADC circuitry coupled to column X+1 may be activated last to perform ADC conversion, and other ADC circuitry may progressively begin and perform ADC conversion at times between the first and last ADC conversion times (e.g., in a linear quantized manner).

The ADC conversion timings for different rows in FIGS. 6A and 6B are merely illustrative. In particular, while only two different progression schemes are shown for each pixel row, other quantized or linear progression may also be used to distribute the conversion times across the pixel row. If desired, non-linear (e.g., pseudo-random, random, etc.) progressions may be used instead of the linear progressions shown in FIGS. 6A and 6B. The timing for the pattern of conversion time across the columns may be determined by state-machine circuitry, memory circuitry, logic circuitry, etc., as examples.

By performing the column-offset ADC conversion in the manner as described in connection with FIGS. 6A and 6B (and FIG. 5), ADC conversion activity (or other processing activity) may be spread across a substantial part or all of the available row time, thereby allowing a more even distribution of readout circuit activation and more uniform power usage.

Figure 7:
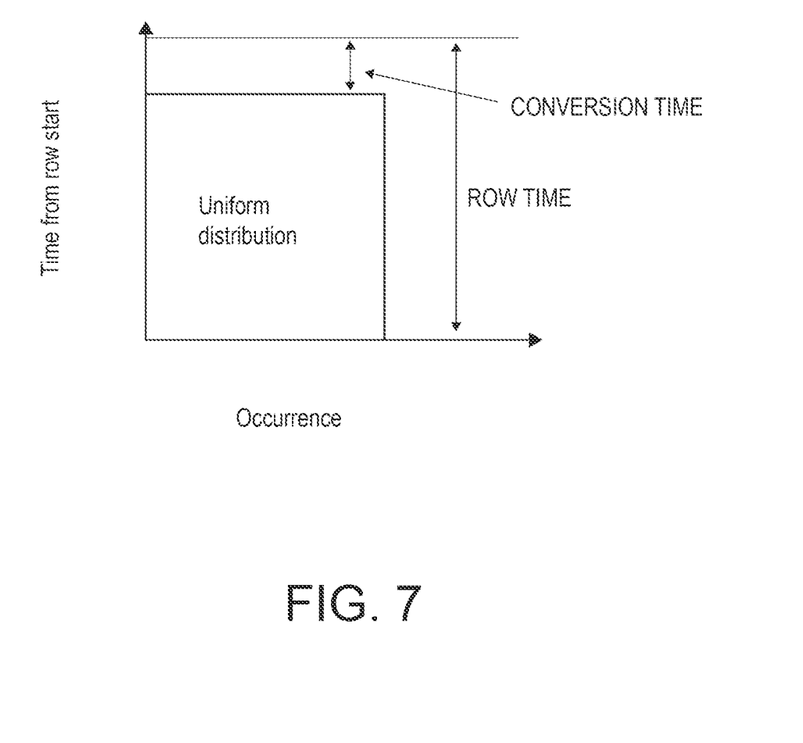
FIG. 7 is an illustrative graph showing how analog-to-digital conversion operations for different pixel columns may be distributed in accordance with some embodiments.

FIG. 7 shows a diagram of illustrative occurrences of ADC conversion times relative to row time across columns for a pixel row. In particular, it may be desirable to implement a uniform distribution of ADC conversion time such that at each moment in the row time, the same and/or a minimal number of ADC circuitry is placed in an active mode (e.g., performs ADC conversion operations). This helps ensure that cumulative system power usage by ADC circuitry across different columns is most evenly distributed.

The uniform distribution of conversion times as shown in FIG. 7 is merely illustrative. If desired, the distribution of conversion times may only be substantially uniform or may be varied in other manners.

To mitigate and resolve fixed pattern artifacts within an image, it may be desirable to perform time-domain multiplexing across columns in different manners using different progressions across different pixel rows. As illustratively shown in FIGS. 6A and 6B, conversion time band 60 for pixel row N may be different from conversion time band 62 for pixel row N+1 (e.g., even though the conversion operations are generating data for the same image frame). Similarly, conversion time pattern within the row time may also be varied across other pixel rows processing signals for the same image frame.

Additionally, to mitigate and resolve fixed pattern artifacts between different image frames, it may be desirable to perform time-domain multiplexing across columns in different manners using different progression for the same pixel row when processing different frames. As illustrative shown in FIG. 6A, conversion time band 60 may be used for performing ADC conversions for a first image frame, while conversion time band 60' may be used for performing ADC conversions for a second image frame. Similarly, in FIG. 6B, conversion time band 62 may be used for performing ADC conversions for a first image frame, while conversion time band 62' may be used for performing ADC conversions for a second image frame.

In general, as desired, the pattern and manner in which time-domain multiplexing across the columns (e.g., for reducing peak to average power ratio) is applied may be varied across the rows and/or may be varied across image frames (e.g., to mitigate against fixed noise artifacts at different levels). The imaging system may include suitable data storage circuitry storing data indicative of the desired pattern of time-domain multiplexing across the columns, and may include (fixed or randomized) data generation circuitry configured to generate the data indicative of the desired pattern. If desired, the pattern data may be updated on a per-row basis, on a per-frame basis, and/or in any other suitable manner.

Various embodiments have been described illustrating systems and methods for reducing peak power in image sensors.

As an example, an image sensor includes image sensor pixels (e.g., forming a stitched image sensor array) arranged in columns and rows, and includes a plurality of readout circuits each coupled to a corresponding column of the image sensor pixels via a corresponding column path (e.g., a column line). The plurality of readout circuits may be configured to perform readout operations during a row time (e.g., including pixel signal settling time on the column paths). The image sensor may further include control circuitry configured to control the plurality of readout circuits to perform time-domain multiplexing for the readout operations across the plurality of readout circuits by activating the plurality of readout circuits during at least first and second offset time periods within the row time.

If desired, the readout operations may occur across the row time in a linear or non-linear (e.g., pseudo-random or random) manner. If desired, occurrences of the analog-to-digital conversion operations may be distributed temporally across the row time in a uniform manner. In some configurations, the plurality of readout circuits each includes analog-to-digital converter circuitry, and the readout operations include analog-to-digital conversion operations. In some configurations, the plurality of readout circuits each includes correlated double sampling circuitry, and the readout operations may include correlated double sampling operations. If desired, each of the plurality of readout circuits may be operable in a pipelined mode of operation, and the readout operations may include sampling operations performed at least partly in parallel with the analog-to-digital conversion operations.

In some configurations, the plurality of readout circuits may be configured to perform additional readout operations during an additional row time. The control circuitry may be configured to control the plurality of readout circuits to perform time-domain multiplexing for the additional readout operations across the plurality of readout circuits by activating the plurality of readout circuits in a different order (or pattern) than an order (or pattern) in which the plurality of readout circuit is activated to perform the time-domain multiplexing for the readout operations.

In some configurations, the plurality of readout circuits may be configured to perform additional readout operations during an additional row time associated with an image frame that is different from an image frame associated with the row time. The control circuitry may be configured to control the plurality of readout circuits to perform time-domain multiplexing for the additional readout operations across the plurality of readout circuits by activating the plurality of readout circuits in a different order (or pattern) than an order (or pattern) in which the plurality of readout circuit is activated to perform the time-domain multiplexing for the readout operations.

As another example, a method of operating an image sensor having image sensor pixels arranged in columns and rows may include: receiving pixel signals from a row of the image sensor pixels at a plurality of readout circuits each coupled to a corresponding column of the image sensor pixels, performing readout operations during a row time associated with the row of the image sensor pixels, and performing time-domain multiplexing for the readout operations across the plurality of readout circuits by activating the plurality of readout circuits at different times across the row time.

If desired, performing the readout operations may include performing analog-to-digital conversion operations during the row time. If desired, the method may further include: performing additional readout operations during an additional row time associated with an additional row of the image sensor pixels, and performing time-domain multiplexing for the additional readout operations across the plurality of readout circuits by activating the plurality of readout circuits in a different manner than a manner in which the plurality of readout circuits is activated for performing time-domain multiplexing for the readout operations. If desired, the method may further include: performing additional readout operations during an additional row time associated with the row of the image sensor pixels, and performing time-domain multiplexing for the additional readout operations across the plurality of readout circuits by activating the plurality of readout circuits in a different manner than a manner in which the plurality of readout circuits is activated for performing time-domain multiplexing for the readout operations. If desired, the plurality of readout circuits may be activated across the row time in a linear progression based on an order of the columns of the image sensor pixels or in a pseudo-random progression.

As yet another example, an image sensor may include an image sensor array having first and second pixels arranged in first and second columns, respectively, and arranged in a same row, include first analog-to-digital converter circuitry coupled to the first pixel using a first column line and configured to begin a first analog-to-digital conversion operation during a row time associated with readout operations for the first and second pixels, and include second analog-to-digital converter circuitry coupled to the second pixel using a second column line and configured to begin a second analog-to-digital conversion operation during the row time. The first analog-to-digital converter circuitry and the second analog-to-digital converter circuitry may be switched to an active mode respectively at first and second different times across the row time to begin the first and second analog-to-digital conversion operations.

In some configurations, the first and second analog-to-digital conversion operations may occur during first and second nonoverlapping time periods across the row time. In some configurations, the image sensor may further include data storage circuitry configured to store data indicative of a timing based on which the first analog-to-digital converter circuitry and the second analog-to-digital converter circuitry are switched to the active mode.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor comprising:
   image sensor pixels arranged in columns and rows;
   a plurality of readout circuits each coupled to a corresponding column of the image sensor pixels, the plurality of readout circuits being configured to perform readout operations during a row time; and
   control circuitry configured to control the plurality of readout circuits to perform time-domain multiplexing for the readout operations across the plurality of readout circuits by activating the plurality of readout circuits during at least first and second offset time periods within the row time.

2. The image sensor defined in claim 1, wherein the readout operations occur across the row time in a linear manner.

3. The image sensor defined in claim 1, wherein the readout operations occur across the row time in a non-linear manner.

4. The image sensor defined in claim 1, wherein the plurality of readout circuits each comprises analog-to-digital converter circuitry, and the readout operations comprise analog-to-digital conversion operations.

5. The image sensor defined in claim 4, wherein each of the plurality of readout circuits is operable in a pipelined mode of operation, and the readout operations comprise sampling operations performed partly in parallel with or partly offset from the analog-to-digital conversion operations.

6. The image sensor defined in claim 1 further comprising:
   a plurality of column paths, the plurality of readout circuits each being coupled to the corresponding column of the image sensor pixels via a respective column path in the plurality of column paths, wherein the row time includes settling time for pixel signals on the plurality of column paths.

7. The image sensor defined in claim 1, wherein the plurality of readout circuits are configured to perform additional readout operations during an additional row time, and the control circuitry is configured to control the plurality of readout circuits to perform time-domain multiplexing for the additional readout operations across the plurality of readout circuits by activating the plurality of readout circuits in a different order than an order in which the plurality of readout circuit is activated to perform the time-domain multiplexing for the readout operations.

8. The image sensor defined in claim 1, wherein the plurality of readout circuits are configured to perform additional readout operations during an additional row time associated with an image frame that is different from an image frame associated with the row time, and the control circuitry is configured to control the plurality of readout circuits to perform time-domain multiplexing for the additional readout operations across the plurality of readout circuits by activating the plurality of readout circuits in a different order than an order in which the plurality of readout circuit is activated to perform the time-domain multiplexing for the readout operations.

9. The image sensor defined in claim 1, wherein the plurality of readout circuits each comprises correlated double sampling circuitry, and the readout operations comprise correlated double sampling operations.

10. The image sensor defined in claim 1, wherein occurrences of the analog-to-digital conversion operations are distributed temporally across the row time in a uniform manner.

11. The image sensor defined in claim 1, wherein the image sensor pixels are formed as a stitched image sensor array.

12. A method of operating an image sensor having image sensor pixels arranged in columns and rows, the method comprising:
receiving pixel signals from a row of the image sensor pixels at a plurality of readout circuits each coupled to a corresponding column of the image sensor pixels;
performing readout operations during a row time associated with the row of the image sensor pixels; and
performing time-domain multiplexing for the readout operations across the plurality of readout circuits by activating the plurality of readout circuits at different times across the row time.

13. The method defined in claim 12, wherein performing the readout operations comprise performing analog-to-digital conversion operations during the row time.

14. The method defined in claim 12 further comprising:
performing additional readout operations during an additional row time associated with an additional row of the image sensor pixels; and
performing time-domain multiplexing for the additional readout operations across the plurality of readout circuits by activating the plurality of readout circuits in a different manner than a manner in which the plurality of readout circuits is activated for performing time-domain multiplexing for the readout operations.

15. The method defined in claim 12 further comprising:
performing additional readout operations during an additional row time associated with the row of the image sensor pixels; and
performing time-domain multiplexing for the additional readout operations across the plurality of readout circuits by activating the plurality of readout circuits in a different manner than a manner in which the plurality of readout circuits is activated for performing time-domain multiplexing for the readout operations.

16. The method defined in claim 12, wherein the plurality of readout circuits is activated across the row time in a linear progression based on an order of the columns of the image sensor pixels.

17. The method defined in claim 12, wherein the plurality of readout circuits is activated across the row time in a pseudo-random progression.

18. An image sensor comprising:
an image sensor array having first and second pixels arranged in first and second columns, respectively, and arranged in a same row;
first analog-to-digital converter circuitry coupled to the first pixel using a first column line and configured to begin a first analog-to-digital conversion operation during a row time associated with readout operations for the first and second pixels; and
second analog-to-digital converter circuitry coupled to the second pixel using a second column line and configured to begin a second analog-to-digital conversion operation during the row time, wherein the first analog-to-digital converter circuitry and the second analog-to-digital converter circuitry are switched to an active mode respectively at first and second different times across the row time to begin the first and second analog-to-digital conversion operations.

19. The image sensor defined in claim 18, wherein the first and second analog-to-digital conversion operations occur during first and second nonoverlapping time periods across the row time.

20. The image sensor defined in claim 18, further comprising:
data storage circuitry configured to store data indicative of a timing based on which the first analog-to-digital converter circuitry and the second analog-to-digital converter circuitry are switched to the active mode.

* * * * *